US011803611B2

(12) United States Patent
Mazzola et al.

(10) Patent No.: US 11,803,611 B2
(45) Date of Patent: Oct. 31, 2023

(54) PROCEDURE TO SPEED-UP VARIATIONAL QUANTUM EIGENSOLVER CALCULATIONS IN QUANTUM COMPUTERS

(71) Applicant: International Business Machines Corporation, Armonk, NY (US)

(72) Inventors: Guglielmo Mazzola, Zurich (CH); Pauline Ollitrault, Zurich (CH); Ivano Tavernelli, Wädenswil (CH)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 17/112,034

(22) Filed: Dec. 4, 2020

(65) Prior Publication Data

US 2022/0179921 A1    Jun. 9, 2022

(51) Int. Cl.
  *G06F 17/16* (2006.01)
  *G06N 10/00* (2022.01)
  *G06F 7/556* (2006.01)

(52) U.S. Cl.
  CPC ............ *G06F 17/16* (2013.01); *G06N 10/00* (2019.01); *G06F 7/556* (2013.01)

(58) Field of Classification Search
  CPC ......... G06F 17/16; G06N 10/10; G06N 10/60
  USPC ....................................................... 708/207
  See application file for complete search history.

(56) References Cited

U.S. PATENT DOCUMENTS

| | | | |
|---|---|---|---|
| 10,255,555 B2 | 4/2019 | Curtis et al. | |
| 10,275,717 B2 | 4/2019 | Babbush et al. | |
| 11,604,644 B1 * | 3/2023 | Rubin | G06F 17/16 |
| 2020/0057957 A1 | 2/2020 | Johnson et al. | |
| 2020/0184023 A1 | 6/2020 | Delaney et al. | |

FOREIGN PATENT DOCUMENTS

| | | |
|---|---|---|
| WO | 2018064535 | 4/2018 |
| WO | 2019150090 | 8/2019 |
| WO | 2020146794 | 7/2020 |

OTHER PUBLICATIONS

Gokhale et al, "Optimization of Simultaneous Measurement for Variational Quantum Eigensolver Applications". (Year: 2000).*

(Continued)

*Primary Examiner* — Tan V Mai
(74) *Attorney, Agent, or Firm* — Amin, Turocy & Watson, LLP

(57) ABSTRACT

Techniques of facilitating improved computational efficiency in Variational Quantum Eigensolver calculations by quantum computing devices. In one example, a system can comprise a processor that executes computer executable components stored in memory. The computer executable components can comprise: a distribution component; and a feedback component. The distribution component can set a Pauli-dependent sample budget for a Pauli term of an operator to unevenly distribute a total sample budget for evaluating an expected value of the operator among a plurality of Pauli terms composing the operator. The plurality of Pauli terms can comprise the Pauli term. The feedback component can evaluate compatibility between a prescreening variance for the Pauli term and a production variance of the Pauli term generated using the Pauli-dependent sample budget.

21 Claims, 8 Drawing Sheets

(56) References Cited

OTHER PUBLICATIONS

Crawford et al., "Efficient quantum measurement of Pauli operators in the presence of finite sampling error," arXiv:1908.06942 [quant-ph], Apr. 21, 2020; 17 pages.
Wecker et al., "Progress towards practical quantum variational algorithms," Phys. Rev. A 92, 042303—Published Oct. 2, 2015; 10 pages.
Kandala et al., "Hardware-efficient variational quantum eigensolver for small molecules and quantum magnets," Nature. Sep. 13, 2017; 549 (7671): 242-246.
Rubin et al., "Application of fermionic marginal constraints to hybrid quantum algorithms," New J. Phys. 20 053020; 2018; 22 pages.

* cited by examiner

PROCEDURE TO SPEED-UP VARIATIONAL QUANTUM EIGENSOLVER CALCULATIONS IN QUANTUM COMPUTERS

BACKGROUND

The subject disclosure relates to quantum computing, and more specifically, to techniques for improving computational efficiency in Variational Quantum Eigensolver calculations by quantum computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate improved computational efficiency in Variational Quantum Eigensolver (VQE) calculations by quantum computing devices are described.

According to an embodiment, a system can comprise a processor that executes computer executable components stored in memory. The computer executable components can comprise: a distribution component; and a feedback component. The distribution component can set a Pauli-dependent sample budget for a Pauli term of an operator to unevenly distribute a total sample budget for evaluating an expected value of the operator among a plurality of Pauli terms composing the operator. The plurality of Pauli terms can comprise the Pauli term. The feedback component can evaluate compatibility between a prescreening variance for the Pauli term and a production variance of the Pauli term generated using the Pauli-dependent sample budget.

According to another embodiment, a computer-implemented method can comprise setting, by a system operatively coupled to a processor, a Pauli-dependent sample budget for a Pauli term of an operator to unevenly distribute a total sample budget for evaluating an expected value of the operator among a plurality of Pauli terms composing the operator. The plurality of Pauli terms can comprise the Pauli term. The computer-implemented method can further comprise evaluating, by the system, compatibility between a prescreening variance for the Pauli term and a production variance of the Pauli term generated using the Pauli-dependent sample budget.

According to another embodiment, a computer program product can comprise a computer readable storage medium having program instructions embodied therewith. The program instructions are executable by a processor to cause the processor to perform operations. The operations can include setting, by the processor, a Pauli-dependent sample budget for a Pauli term of an operator to unevenly distribute a total sample budget for evaluating an expected value of the operator among a plurality of Pauli terms composing the operator. The plurality of Pauli terms can comprise the Pauli term. The operations can further include evaluating, by the processor, compatibility between a prescreening variance for the Pauli term and a production variance of the Pauli term generated using the Pauli-dependent sample budget.

DETAILED DESCRIPTION

Figure 1:
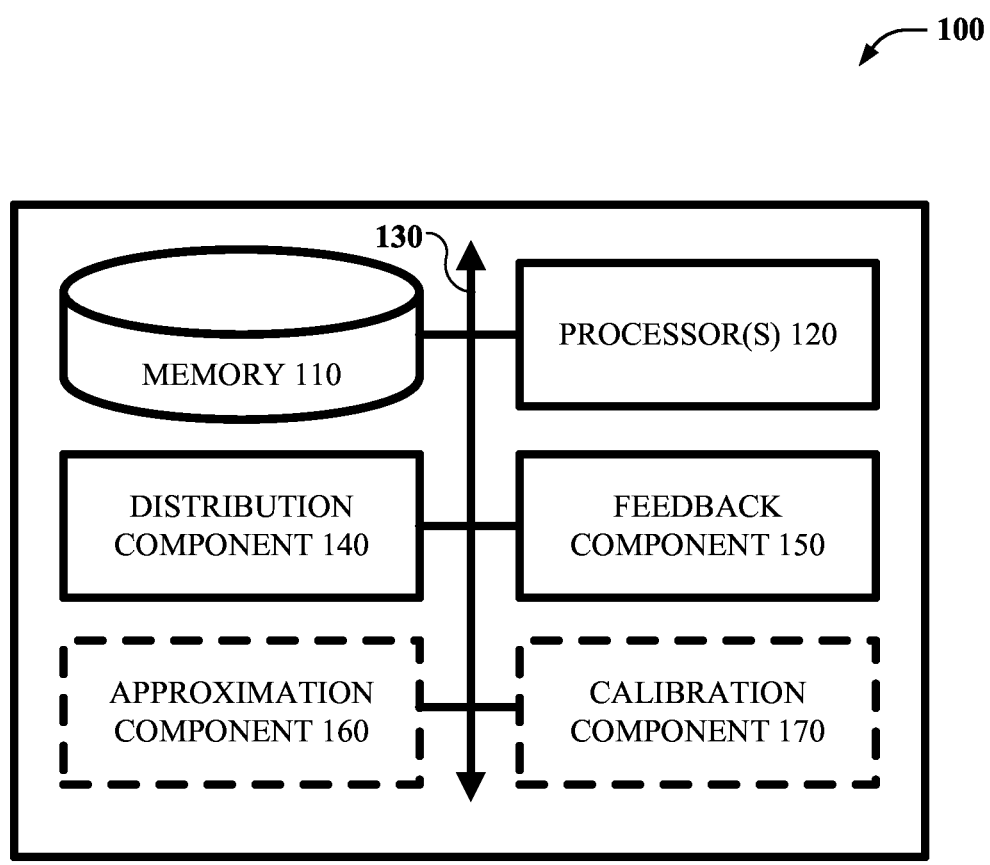
FIG. 1 illustrates a block diagram of an example, non-limiting system that can facilitate improved computational efficiency in Variational Quantum Eigensolver (VQE) calculations by quantum computing devices, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Classical computers operate on binary digits (or bits) that store or represent information as binary states to perform computing and information processing functions. In contrast, quantum computing devices operate on quantum bits (or qubits) that store or represent information as both the binary states and superpositions of the binary states. To that end, quantum computing devices utilize quantum-mechanical phenomena, such as entanglement and interference.

A quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0\rangle + \beta|1\rangle$, where $\alpha$ and $\beta$ are complex scalars such that $|\alpha|^2 + |\beta|^2 = 1$), allowing a number of qubits to theoretically hold exponentially more information than a same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a mixture of states—for example: 63 percent 0 and 37 percent 1. General quantum programs require coordination of quantum and classical parts of a computation. One way to think about general quantum programs is to identify processes and abstractions involved in specifying a quantum algorithm, transforming the algorithm into executable form, running an experiment or simulation, and analyzing the results. A notion throughout these processes is use of intermediate representations. An intermediate representation (IR) of a computation is neither its source language description nor the target machine instructions, but something in between. Compilers may use several IRs during a process of translating and optimizing a program. The input is source code describing a quantum algorithm and compile time parameter(s). The output is a combined quantum/classical program expressed using a high-level IR. A distinction between a quantum and classical computer is that the quantum computer is probabilistic, thus measurements of algorithmic outputs provide a proper solution within an algorithm specific confidence interval. The computation is then repeated until a satisfactory probable certainty of solution can be achieved.

The following definitions are used throughout the present disclosure, unless specifically indicated otherwise. A "Hamiltonian" (H) denotes an operator that fully defines a quantum system. The lowest eigenstate of such operators can be called a ground state that can be the target of quantum chemistry calculations. A Hamiltonian, written in a computational basis state, can be different for each molecule. "Energy" denotes an expectation value of a Hamiltonian on a given normalized quantum state. Energy can be minimized when the state is the ground state.

A "Variational Quantum Eigensolver" (VQE) denotes a near term quantum algorithm that can find a ground state of a Hamiltonian on a quantum computing device. A VQE can be based on a variational principle. A VQE can be successful when a cost function to be minimized reaches an optimal value. A "circuit" denotes a sequence of gates that can be implemented on a quantum computing device to formally realize a unitary operator that acts on a given initial quantum state and produces a final quantum state. Circuits can be parametrized via gate parameters such as one or more angles of a single qubit rotation gate. A "gate" denotes an operation on a quantum system that transforms a quantum state.

A "measurement" denotes a single N-qubit read-out (e.g., a projection of each qubit on either the 0 or 1 state) that can be obtained after a single circuit execution. In practice, measurements can be involved in computing a cost function. "Walltime" denotes a time to run (or execute) a VQE algorithm. Walltime can be directly proportional to a number of measurements (hence circuit repetitions) involved in executing a VQE algorithm. "Computational gain" denotes a ratio between a walltime associated with running a VQE algorithm by implementing one or more embodiments of the present disclosure and a walltime associated with running the VQE algorithm utilizing without implementing one or more embodiments of the present disclosure.

FIG. 1 illustrates a block diagram of an example, non-limiting system 100 that can facilitate improved computational efficiency of Variational Quantum Eigensolver (VQE) calculations in quantum computing devices, in accordance with one or more embodiments described herein. System 100 includes memory 110 for storing computer-executable components and one or more processors 120 operably coupled via one or more communication busses 130 to memory 110 for executing the computer-executable components stored in memory 110. As shown in FIG. 1, the computer-executable components include: distribution component 140; and feedback component 150.

Distribution component 140 can set a Pauli-dependent sample budget for a Pauli term of an operator to unevenly distribute a total sample budget for evaluating an expected value of the operator among a plurality of Pauli terms composing the operator. The plurality of Pauli terms can comprise the Pauli term. In an embodiment, distribution component 140 can set the Pauli-dependent sample budget to a baseline number of samples when the prescreening variance fails to breach a defined threshold value. In an embodiment, distribution component 140 can set the Pauli-dependent sample budget utilizing an intrinsic variance of the Pauli term. In an embodiment, distribution component 140 can set the Paul-dependent sample budget for a group of Pauli terms comprising the operator. In an embodiment, the group of Pauli terms comprise a common computational basis. Feedback component 150 can evaluate compatibility between a prescreening variance for the Pauli term and a production variance of the Pauli term generated using the Pauli-dependent sample budget.

In an embodiment, the computer-executable components stored in memory 110 can further include: approximation component 160; and calibration component 170. Approximation component 160 can generate the prescreening variance for the Pauli term using a de minimis sampling budget. Calibration component 170 can allocate additional samples to the Pauli-dependent sample budget up to a uniformly distributed sample budget when an evaluation by the feedback component determines that the prescreening variance is incompatible with the production variance generated using the Pauli-dependent sample budget. The functionality of the computer-executable components utilized by the embodiments will be covered in greater detail below.

Figure 2:
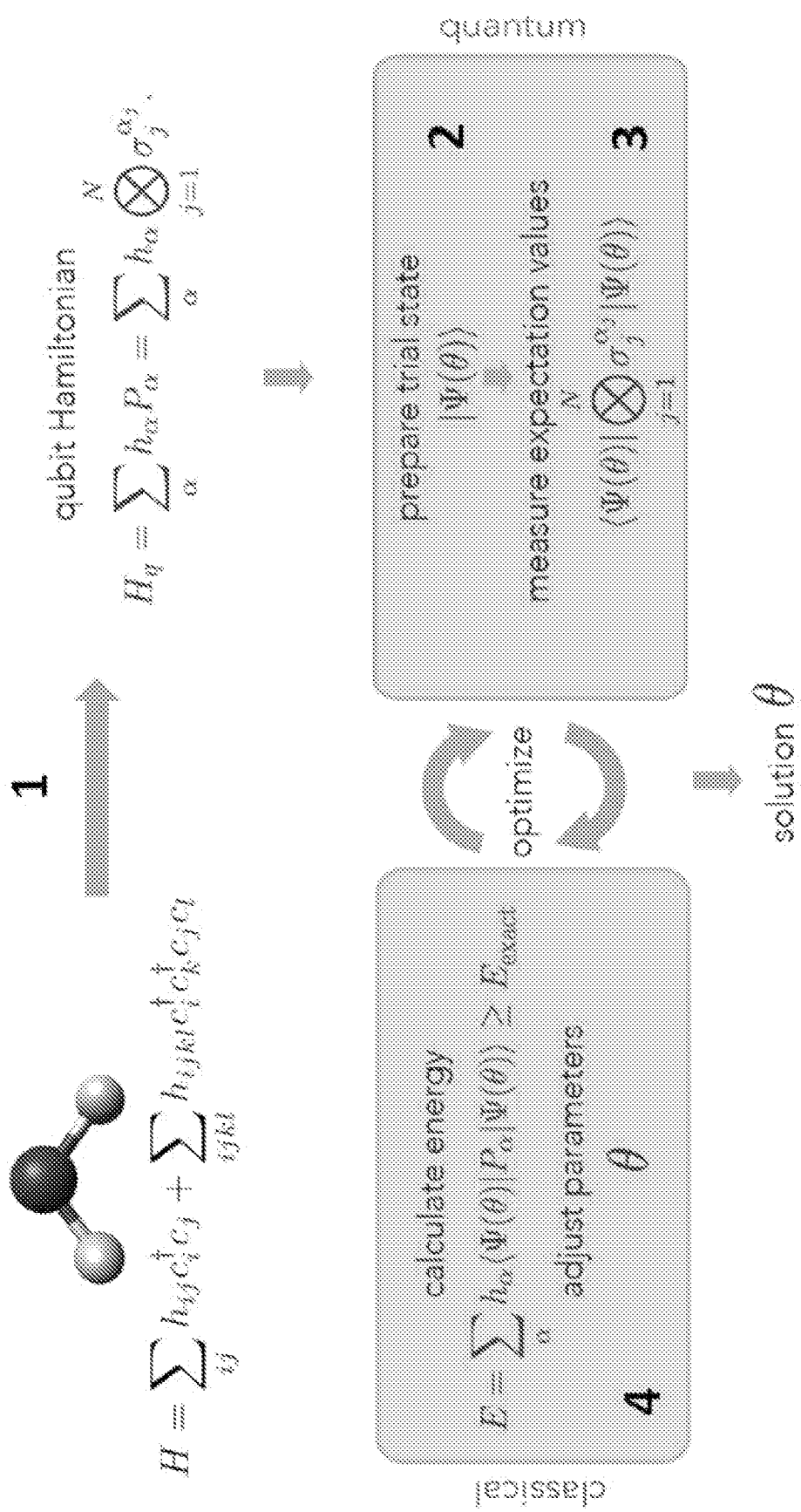
FIG. 2 illustrates an example, non-limiting high-level conceptual overview of executing VQE calculations using quantum computing devices, in accordance with one or more embodiments described herein.

FIG. 2 illustrates an example, non-limiting high-level conceptual overview of executing VQE calculations using quantum computing devices, in accordance with one or more embodiments described herein. As shown by FIG. 2, classical computing devices can be leveraged non-concurrently in tandem with quantum computing devices to execute VQE calculations. In FIG. 2, designator 210 illustrates that executing a VQE calculation 200 can involve encoding a fermionic molecular Hamiltonian into a qubit operator that can be executed on a quantum computing device. The VQE calculation 200 can further involve preparing a trial (or quantum) state for the quantum computing device, as illustrated by designator 220. In an embodiment, the trial state can be prepared by combinations of reset operations implemented with single- and/or multi-qubit quantum gates. In an embodiment, parameters of the trial state can be parametrized using a quantity $\Theta$.

As illustrated by designator 230, the VQE calculation 200 can further involve measuring expectation values of qubit operators, such as energy and cost functions, using circuit gates implemented by the quantum computing device. For example, executing a VQE calculation can involve evaluating a cost function as a sum of different Pauli operators (e.g., tensor products of Pauli matrices). In FIG. 2, designator 240 illustrates that executing the VQE calculation 200 can further include the classical computing device and quantum computing device interacting to iteratively optimize the parameters defining the circuit gates. By optimizing those parameters, the classical computing device can minimize the energy to obtain a solution for the VQE calculation 200. In an embodiment, the iterative optimization process can continue until a cost of the measured quantum states stabilizes or until another pre-determined outcome is met.

VQE calculations (e.g., VQE calculation 200) can be executed to evaluate quantum chemistry applications, many-body lattice models (e.g. Hubbard), lattice gauge theory models, and the like. A substantial number of measurements can be involved in evaluating expectation values of qubit operators using VQE calculations. That substantial number of measurements can negatively impact the computational efficiency of VQE calculations. Reducing the number of measurements that are performed in a quantum computing device to reach a given accuracy of a desired expectation value can improve computational efficiency and can linearly speed up an execution time. For example, chemical problems such as solving an electronic structure of a molecule can involve an accuracy known as a chemical accuracy (e.g., 1 kcal/mol) to provide useful results. Statistical noise introduced by measurements of an observable in a quantum computing device executing a VQE calculation can inhibit reaching the chemical accuracy.

Various embodiments of the present disclosure provide techniques for improving computational efficiency in VQE calculations by quantum computing devices. To that end, embodiments of the present disclosure can reduce a number of measurements to reach a target statistical accuracy in an evaluation of a cost function. Additionally, embodiments of the present disclosure can estimate a cost function with better precision while keeping a fixed number of measurements. In accordance with various embodiments, an order-of-magnitude speedup in execution time or more can be obtained without introducing additional resource requirements, such as additional qubits or additional circuit depths (e.g., a number of gates), such that a quantum computing device is unable to practically execute a VQE calculation. Embodiments of the present disclosure can be implemented such that the increased precision in the estimation of cost functions does not come at the expense of accuracy. For example, the same VQE calculation can be executed without bias.

Continuing with the example above in which the qubit Hamiltonian encodes the fermionic molecular Hamiltonian, executing the VQE calculation can involve evaluating an energy of the qubit Hamiltonian. In an embodiment, the qubit Hamiltonian can be written as a weighted sum of non-commuting Pauli operators (P) as defined by Equation 1:

$$H = \sum_{k=1}^{K} c_k P_k, P_k \in \{I, \sigma^x, \sigma^y, \sigma^z\}^{\otimes N}.$$

Equation 1

In accordance with Equation 1 above: K denotes the maximum number of Pauli operators (or terms) that compose the Hamiltonian; $c_k$ denotes the k-th coefficient of the expansion (notice that the sets $c_k$ and $P_k$ univocally define the physical problem one aims to solve); $P_k$ is the k-th Pauli term, which is a tensor product of N single qubit Pauli matrices; I denotes the identity matrix; $\sigma^x$ denotes the "sigma-X" Pauli matrix; $\sigma^y$ denotes the "sigma-Y" Pauli matrix; $\sigma^z$ denotes the "sigma-Z" Pauli matrix; and N denotes the total number of qubits needed to define the Hamiltonian and is equal to the size of the quantum register. Such estimator can have a finite (and large) variance even when sampling from a ground state, as the statistical error can be bounded by the expression defined by Equation 2:

$$\epsilon = \sqrt{\sum_k c_k^2 V_{P_k}/S} \leq \sqrt{\sum_k c_k^2/S}.$$

Equation 2

In accordance with Equation 2 above: $V_{P_k}$ denotes the intrinsic variance of the Paul operator where $V_{P_k} = \langle P_k^2 \rangle - \langle P_k \rangle^2$ and S denotes a number of measurements (or shots) used to evaluate the expectation values $\langle P_k \rangle$. In practice, evaluating expectation values of the energy and/or cost function with sufficiently high precision generally involves a large S so that a classical optimizer (e.g., the classical computing device of FIG. 2) can successfully drive the minimization towards a minimum. Of note, each measurement of S generally involves repetition of a quantum circuit executed by the quantum computing device. Each repetition can increase an execution time of the VQE. Such increased execution time can generally be dominated by a qubit reset time. As a result, evaluating a single value of a cost function through execution of a VQE calculation can involve hours or days of measurements even for relatively small molecules.

One approach of executing a VQE calculation can assume that a number of measurements (S) is constant for each Pauli term composing a Hamiltonian, such that a total number of measurements or total sample budget ($S_{tot}$) for executing the VQE calculation is $S_{tot}$=SK. By assuming the number of measurements is constant for each Pauli term, this approach utilizes a uniformly distributed sample budget. Embodiments of the present disclosure can redistribute the total number of measurements or total sample budget unevenly between the K Pauli terms composing a Hamiltonian to improve computational efficiency.

To that end, embodiments of the present disclosure can set (e.g., using distribution component 140) a Pauli-dependent sample budget for a Pauli term of a Hamiltonian (or operator) to unevenly distribute a total sample budget for evaluating an expected value of the Hamiltonian among K Pauli terms composing the Hamiltonian, where K>1. In an embodiment, the Pauli-dependent sample budget can be set utilizing the function defined by Equation 3:

$$S_k = \max\left(S_0, \frac{(|c_k|\sqrt{V_{P_k}^*})^\alpha}{\sum_{l=1}^{K}(|c_l|\sqrt{V_{P_l}^*})^\alpha}\right).$$

Equation 3

In accordance with Equation 3 above: $S_k$ denotes a Pauli-dependent sample budget; $S_0$ denotes a baseline number of measurements (or samples); $\sqrt{V_{P_k}^*}$ and $\sqrt{V_{P_l}^*}$ denote estimates of a square root of a variance of the generic k-th and l-th Pauli terms, respectively; $c_l$ denotes the k-th coefficient of the expansion (see Equation 1); and a denotes a real parameter that can be tuned to maximize efficiency. In an embodiment, $S_0 \ll S$ to regularize evaluation of a cost function through execution of the VQE calculation. In an embodiment, the Pauli-dependent sample budget $S_k$ can be set (e.g., using distribution component 140 of FIG. 1) to a baseline number of samples $S_0$ when a prescreening variance fails to breach a defined threshold value. In an embodiment, the defined threshold value can be determined using the following function:

$$\frac{\left(|c_k|\sqrt{V_{P_k}^*}\right)^\alpha}{\sum_{l=1}^{K}\left(|c_l|\sqrt{V_{P_l}^*}\right)^\alpha}.$$

In an embodiment, α can be tuned once at a beginning of executing a VQE calculation. In an optimal case in which the variance of the k-th Pauli term can be exactly estimated, α can be fixed to 1. However, one skilled in the art will appreciate that exactly estimating the variance of the k-th Pauli term can be impractical in as much as doing so can involve an infinite number of measurements (or samples).

Of note, setting a Pauli-dependent sample budget $S_k$ in accordance with embodiments of the present disclosure is distinct from naïvely redistributing a total sample budget $S_{tot}$ by following amplitudes of the Pauli coefficients, as defined by Equation 4:

$$S_K^{naive} = \frac{|c_k|}{\sum_{l=1}^{K}|c_l|}. \qquad \text{Equation 4}$$

In accordance with Equation 4 above: $S_k^{naive}$ denotes a naïve Pauli-dependent sample budget that can be obtained from naïvely redistributing a total sample budget $S_{tot}$ by following a prescription that only takes into account amplitudes of the Pauli coefficients $c_k$. One aspect of naïvely redistributing a total sample budget $S_{tot}$ is that some Pauli terms having relatively large weights $c_k$ can have small variances. For example, some Pauli terms that are diagonal in a computational basis can have relatively large weights $c_k$ while having substantially zero variance. As such, a naïve Pauli-dependent sample budget $S_K^{naive}$ that obtained from naïvely redistributing a total sample budget $S_{tot}$ can be less than optimal.

Figure 3:
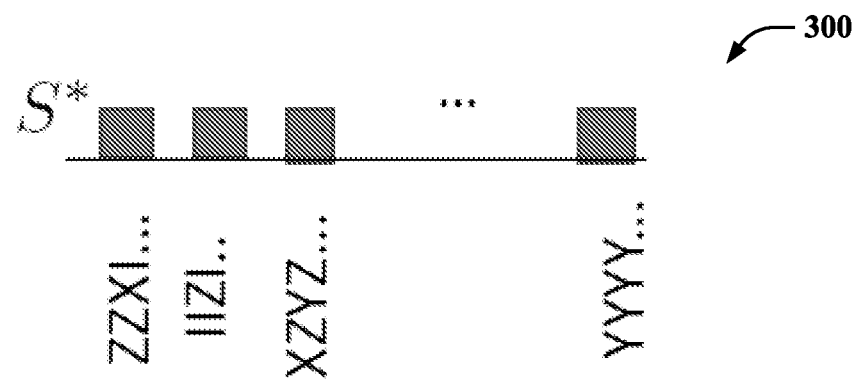
FIG. 3 illustrates an example, non-limiting prescreening variance operation, in accordance with one or more embodiments described herein.

FIG. 3 illustrates an example, non-limiting prescreening variance operation 300, in accordance with one or more embodiments described herein. In an embodiment, prescreening variance operation 300 can be implemented using approximation component 160 of FIG. 1. In an embodiment, a prescreening variance or an estimate of a square root of a variance of the k-th Pauli term, $\sqrt{V_{P_k}^*}$, can be obtained using prescreening variance operation 300. As shown by FIG. 3, prescreening variance operation 300 can involve generating a prescreening variance for a k-th Pauli term using a de minimis sampling budget S*. In an embodiment, the de minimis sampling budget S*<<S. For example, the de minimis sampling budget S* can be set as $$\frac{S}{100}.$$

measurements obtained tor the k-th Pauli term using the de minimis sampling budget S* can be used to generate (or compute) the prescreening variance, $\sqrt{V_{P_k}^*}$, for the k-th Pauli term.

Figure 4:
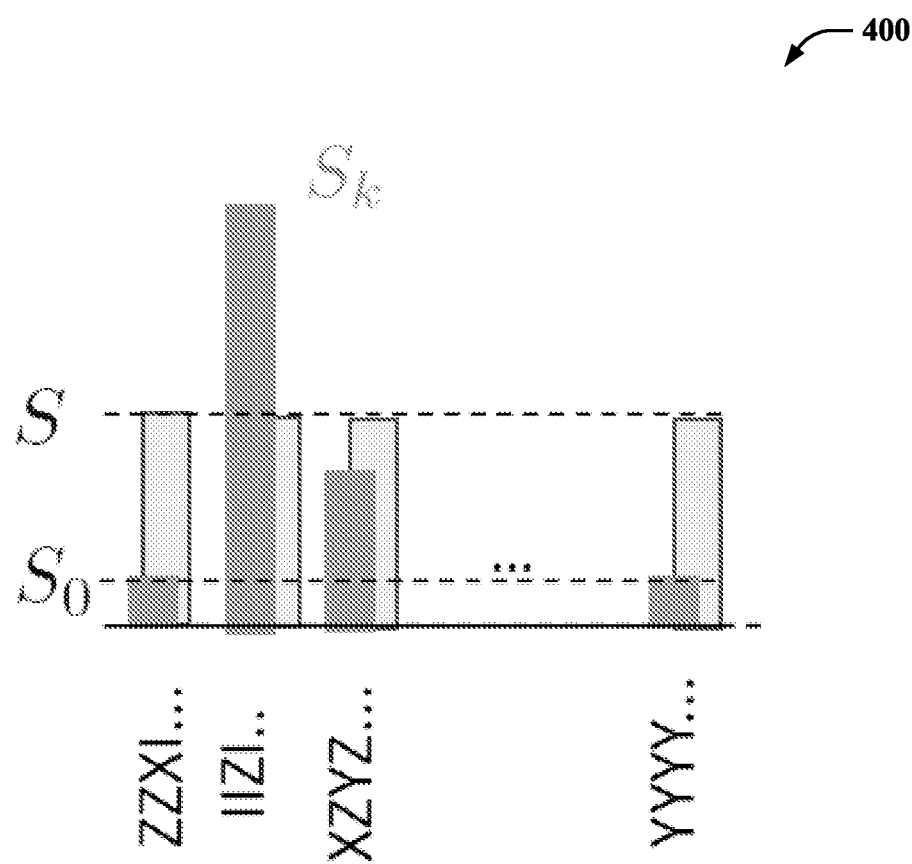
FIG. 4 illustrates an example, non-limiting production variance operation, in accordance with one or more embodiments described herein.

FIG. 4 illustrates an example, non-limiting production variance operation 400, in accordance with one or more embodiments described herein. In an embodiment, a production variance of a k-th Pauli term or a square root of a variance of the k-th Pauli term, $\sqrt{V_{P_k}[S_k]}$, generated using a Pauli-dependent sample budget $S_k$ can be obtained using production variance operation 400. Each Pauli term among the K Pauli terms composing the Hamiltonian can be allocated a Pauli-dependent sample budget $S_k$ to generate a production variance for that Pauli term. In an embodiment, each Pauli term among the K Pauli terms composing the Hamiltonian can be allocated a Pauli-dependent sample budget $S_k$ using the function defined by Equation 3.

As shown by FIG. 4, different Pauli terms within the K Pauli terms composing the Hamiltonian can be allocated different Pauli-dependent sample budgets $S_k$ to optimally allocate a total sample budget, $S_{tot}$ for executing the VQE calculation. To that end, embodiments of the present disclosure can evaluate (e.g., using feedback component 150) compatibility between a prescreening variance for a k-th Pauli term and a production variance of the k-th Pauli term generated using a Pauli-dependent sample budget. Evaluating such compatibility can involve checking that a square root of a variance of a k-th Pauli term generated using a Pauli-dependent sample budget, $\sqrt{V_{P_k}[S_k]}$, is statistically compatible with a prescreening variance for the k-th Pauli term generated using a de minimis sampling budget S*. In an embodiment, such compatibility can be evaluated utilizing the relationship defined by Equation 5:

$$\sqrt{V_{P_k}[S_k]} < c\sqrt{V_{P_k}^*} \qquad \text{Equation 5.}$$

In accordance with Equation 5 above: c denotes a tunable scalar factor. In an embodiment, c can be approximately equal to 5 when evaluating the relationship defined by Equation 5. In an embodiment, additional samples (or measurements) can be allocated (e.g., using calibration component 170 of FIG. 1) to a Pauli-dependent sample budget $S_k$ up to a uniformly distributed sample budget $$S = \frac{S_{tot}}{K}$$

when an evaluation or the relationship defined by Equation 5 determines that a prescreening variance is incompatible with a production variance generated using the Pauli-dependent sample budget $S_k$.

In an embodiment, a Pauli-dependent sample budget can be set for a group of Pauli terms comprising an operator. In this embodiment, the group of Pauli terms can comprise a common computational basis. In an embodiment, the group of Pauli terms can share a complexity class, and so the group of Pauli terms can be measured simultaneously in evaluating expectation values using VQE calculations.

Figure 5:
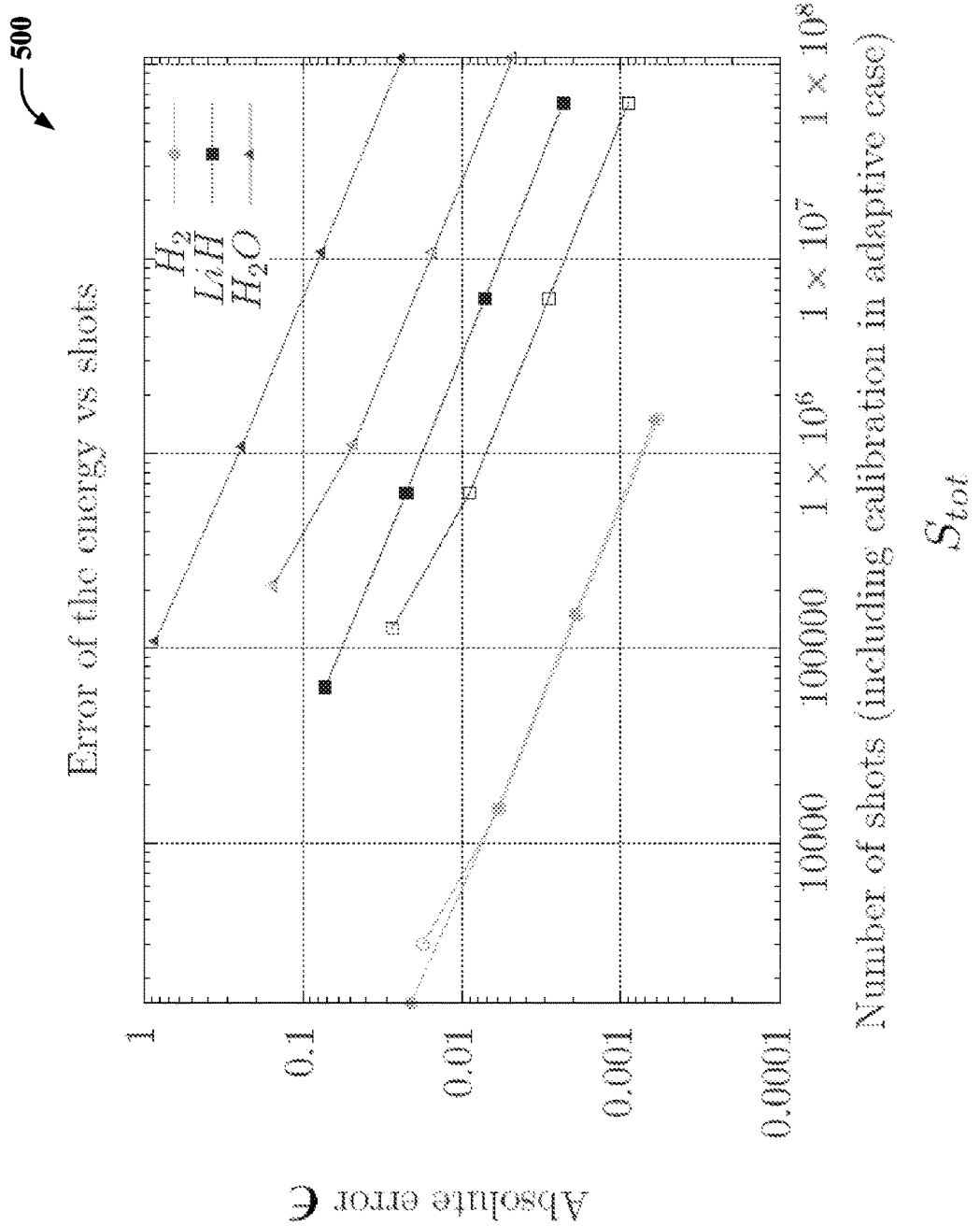
FIG. 5 illustrates an example, non-limiting logarithmic chart depicting absolute error as a function of total sample budget, in accordance with one or more embodiments described herein.

FIG. 5 depicts results of an example demonstration of evaluating expectation values for a representative class of molecular Hamiltonians with VQE calculations using quantum computing devices. In particular, FIG. 5 illustrates an example, non-limiting logarithmic chart 500 depicting absolute error as a function of total sample budget, in accordance with one or more embodiments described herein. The representative class of molecular Hamiltonians utilized in the example demonstration include: molecular hydrogen ($H_2$) that was evaluated using a four-qubit quantum circuit; a lithium hydride (LiH) molecule that was evaluated using a twelve-qubit quantum circuit; and a water ($H_2O$) molecule that was evaluated using a 14-qubit quantum circuit. To obtain chart 500, de minimis sampling budgets S* and a baseline number of samples $S_0$ were each set to 100 samples (or measurements) and tuning parameter α was set to 1.

In chart 500, filled markers correspond to expectation value evaluations implemented using uniformly distributed sample budgets $$S = \frac{S_{tot}}{K}$$

and empty markers correspond to expectation value evaluations implemented using Pauli-dependent sample budgets $S_k$ set in accordance with one or more embodiments described herein. As shown by chart 500, using Pauli-dependent sample budgets $S_k$ to implement expectation value evaluations can facilitate decreasing statistical error by almost an order of magnitude at a fixed total sample budget $S_{tot}$. Since statistical error can scale with an inverse square root of a number of samples, computational gain can scale with a square of this improvement in statistical error. In some instances, samples (or measurements) comprising a de minimis sampling budget S* can impact the reduction in statistical error obtained. However, any such impact can become negligible at higher total sample budgets $S_{tot}$, as also shown by chart 500.

Figure 6:
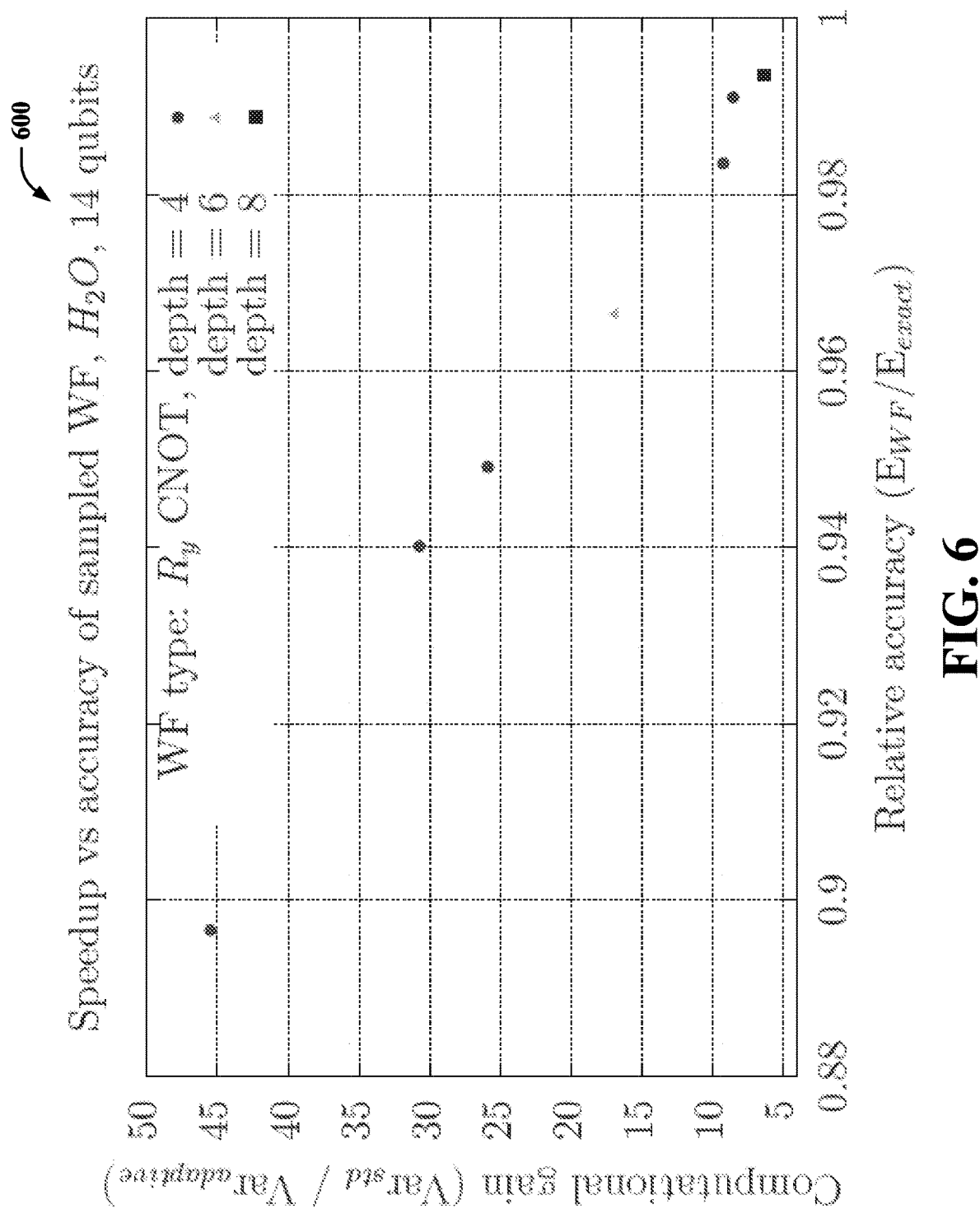
FIG. 6 illustrates an example, non-limiting chart depicting computational gain as a function of relative accuracy, in accordance with one or more embodiments described herein.

FIG. 6 depicts results of an example demonstration of evaluating an empirical computational gain for a water ($H_2O$) molecule Hamiltonian and for different wavefunctions. In particular, FIG. 6 illustrates an example, non-limiting chart 600 depicting computational gain as a function of relative accuracy, in accordance with one or more embodiments described herein. To obtain chart 600, quantum states were produced by different quantum circuits (e.g., quantum circuits comprising different depths and parameters). The example demonstration measured a relative accuracy of the different quantum circuits by comparing an energy of a resulting wavefunction with an exact ground state energy of the Hamiltonian. As shown by chart 600, computational gain can increase when a quantum circuit produces a quantum state that differs from an exact ground state. For example, computational gain can increase during the first steps of optimization during a VQE run. Chart 600 further shows that computational gain was always present in the example demonstration. For example, computational gain in chart 600 is always above one even as relative accuracy approaches one.

Figure 7:
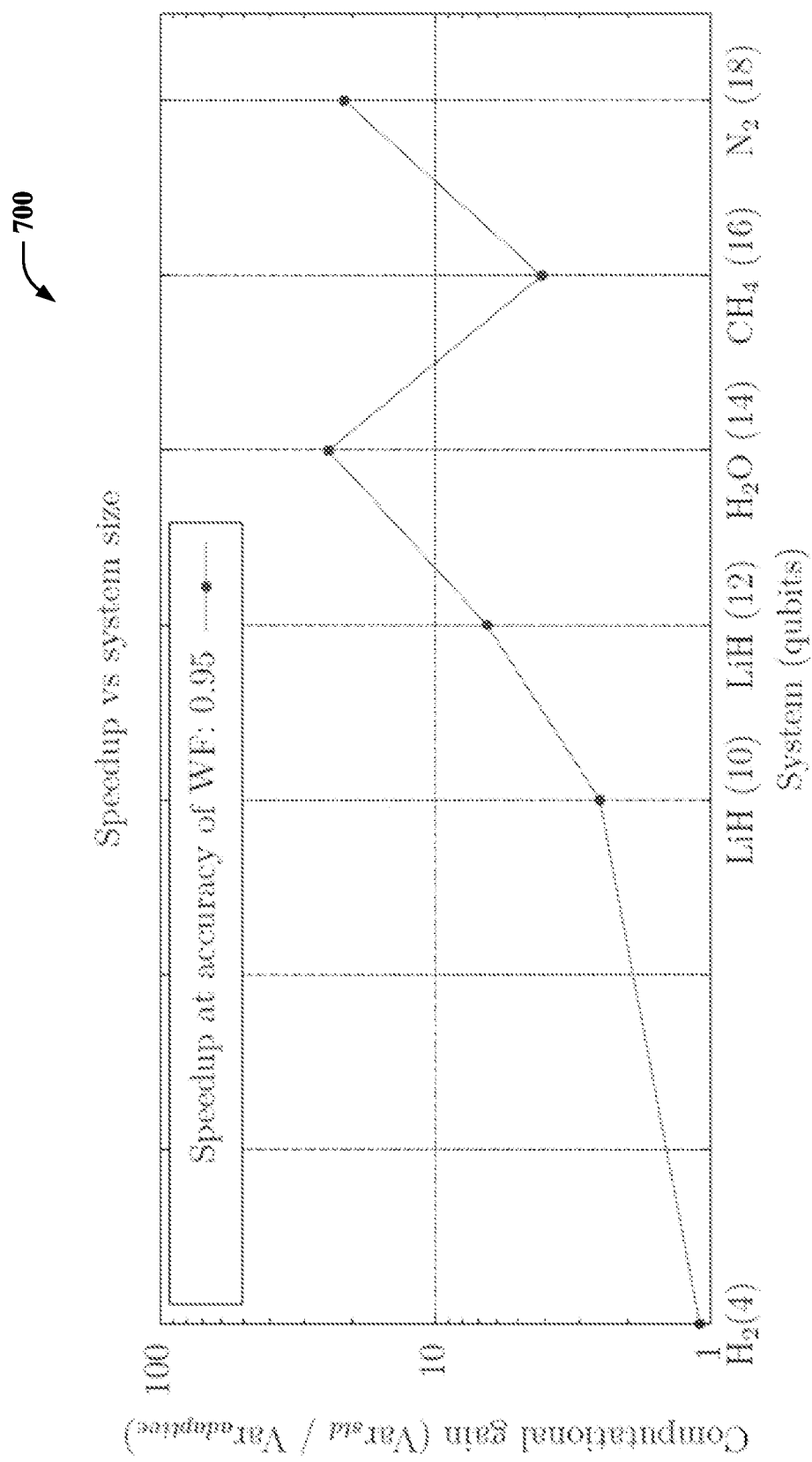
FIG. 7 illustrates an example, non-limiting chart depicting computational gain as a function of system size, in accordance with one or more embodiments described herein.

FIG. 7 depicts results of an example demonstration of empirical computation gain for different Hamiltonians (e.g., different quantum chemistry models) and at a fixed wavefunction accuracy for up to an eighteen-qubit Hamiltonian. In particular, FIG. 7 illustrates an example, non-limiting chart 700 depicting computational gain as a function of system size, in accordance with one or more embodiments described herein. As shown by chart 700, computational gain can increase with system size. For example, chart 700 shows that computational gains associated with water ($H_2O$) molecule and dinitrogen ($N_2$) molecule Hamiltonians can exceed an order of magnitude. In accordance with embodiments of the present disclosure, a walltime of a full VQE run using a quantum computing device can be executed approximately 10-100 times faster.

Figure 8:
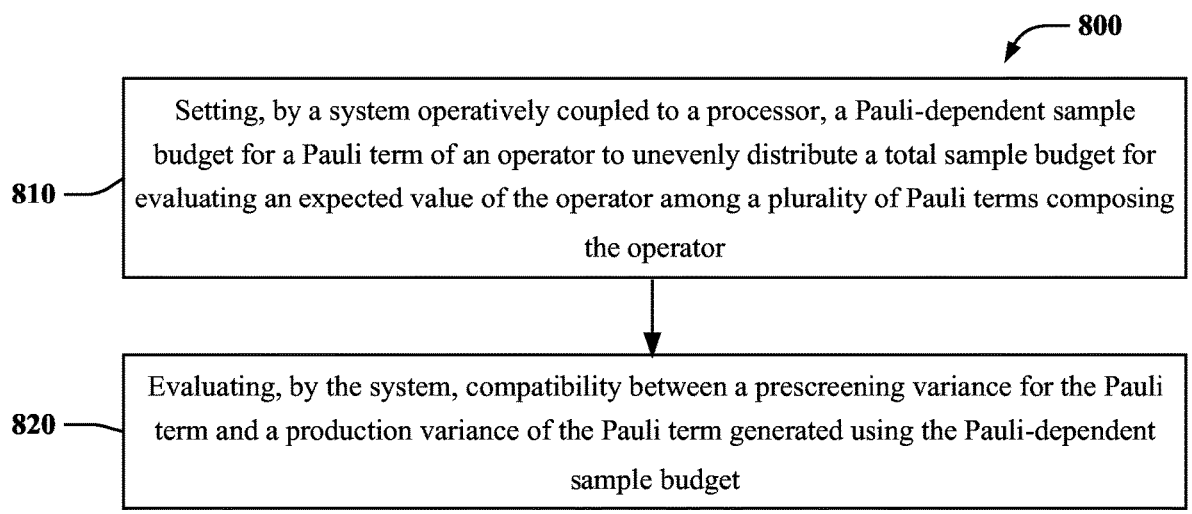
FIG. 8 illustrates a flow diagram of an example, non-limiting computer-implemented method of facilitating improved computational efficiency in VQE calculations by quantum computing devices, in accordance with one or more embodiments described herein.

FIG. 8 illustrates a flow diagram of an example, non-limiting computer-implemented method 800 of facilitating improved computational efficiency in VQE calculations by quantum computing devices, in accordance with one or more embodiments described herein. Repetitive description of like elements employed in other embodiments described herein is omitted for sake of brevity. At 810, the computer-implemented method 800 can comprise setting, by a system operatively coupled to a processor (e.g., with distribution component 140), a Pauli-dependent sample budget for a Pauli term of an operator to unevenly distribute a total sample budget for evaluating an expected value of the operator among a plurality of Pauli terms composing the operator. The plurality of Pauli terms can comprise the Pauli term. In an embodiment, the system can set the Pauli-dependent sample budget to a baseline number of samples when the prescreening variance fails to breach a defined threshold value. In an embodiment, the system can set the Pauli-dependent sample budget to a baseline number of samples when the prescreening variance fails to breach a defined threshold value. In an embodiment, the system can set the Pauli-dependent sample budget utilizing an intrinsic variance of the Pauli term. At 820, the computer-implemented method 800 can comprise evaluating, by the system (e.g., with feedback component 150), compatibility between a prescreening variance for the Pauli term and a production variance of the Pauli term generated using the Pauli-dependent sample budget.

In an embodiment, the computer-implemented method 800 can further comprise: generating, by the system, the prescreening variance for the Pauli term using a de minimis sampling budget. In an embodiment, the computer-implemented method 800 can further comprise: allocating, by the system, additional samples to the Pauli-dependent sample budget up to a uniformly distributed sample budget when an evaluation by the feedback component determines that the prescreening variance is incompatible with the production variance generated using the Pauli-dependent sample budget.

Figure 9:
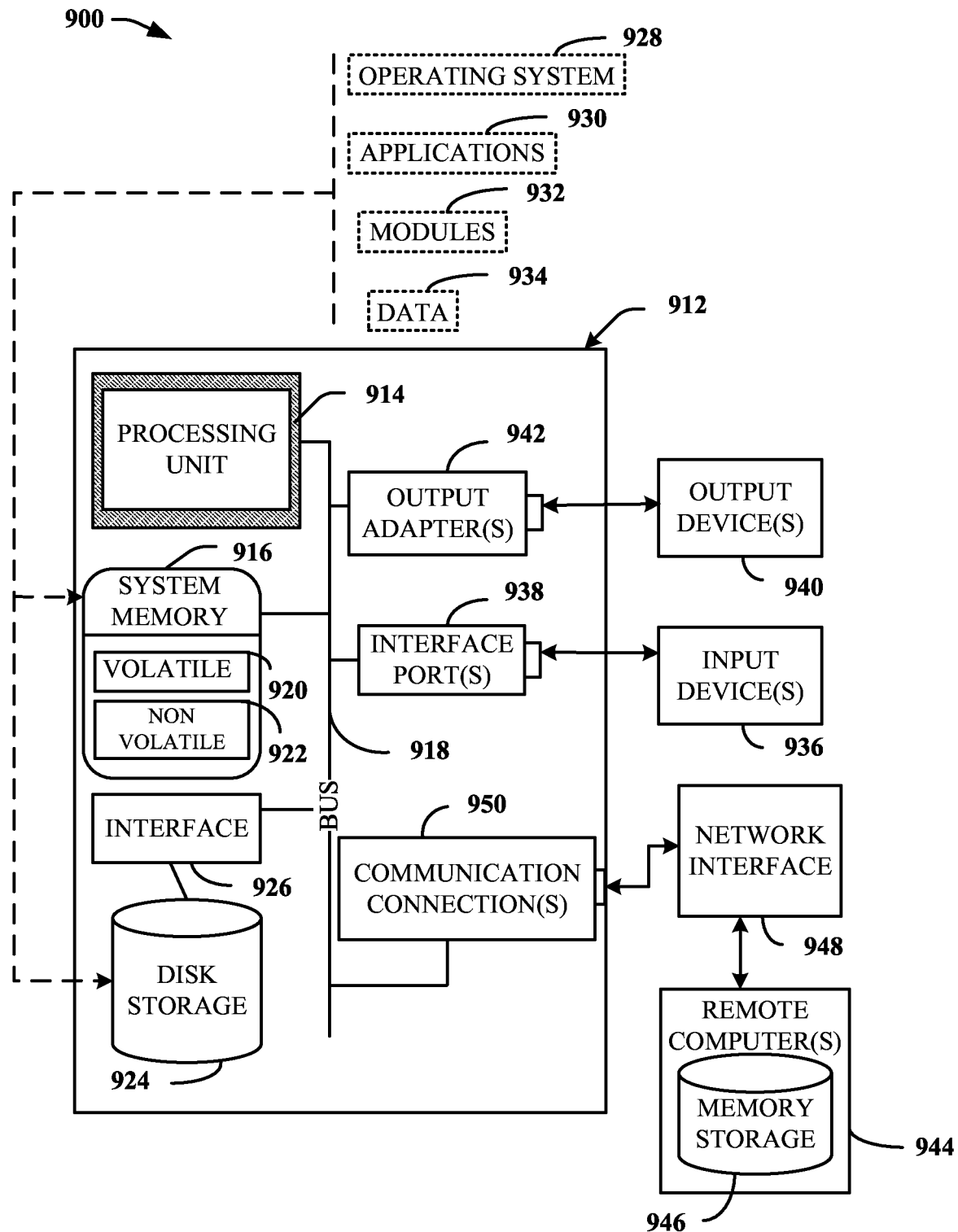
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It can be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device or other common network node and the like, and typically can also include many or the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components; and
 a processor that executes the computer-executable components stored in the memory, wherein the computer executable components comprise:
  a distribution component that sets a Pauli-dependent sample budget for a Pauli term of an operator to unevenly distribute a total sample budget for evaluating an expected value of the operator among a plurality of Pauli terms composing a Hamiltonian; and a feedback component that:
executes, using a quantum computing device, a variational quantum eigensolver on the Pauli term of the operator using the Pauli-dependent sample budget, and
evaluates compatibility between a prescreening variance for the Pauli term and a production variance of the Pauli term generated using the Pauli-dependent sample budget.

2. The system of claim 1, wherein the distribution component sets the Pauli-dependent sample budget utilizing the following equation:

$$S_k = \max\left(S_0, \frac{\left(|c_k|\sqrt{V_{P_k}^*}\right)^\alpha}{\sum_{l=1}^{K}\left(|c_l|\sqrt{V_{P_l}^*}\right)^\alpha}\right)$$

wherein:
$S_k$ denotes a Pauli-dependent sample budget;
$S_0$ denotes a baseline number of measurements (or samples);
K denotes the total number of Pauli terms in the Hamiltonian;
$c_k$ and $c_l$ denote the k-th and l-th coefficients of a Hamiltonian expansion, respectively;
$V_{P_k}^*$ and $V_{P_l}^*$ denote the measured variance of the generic k-th and l-th Pauli term, respectively; and
α denotes a real parameter that can be tuned to maximize efficiency.

3. The system of claim 1, wherein the feedback component evaluates the compatibility utilizing the following relationship: $\sqrt{V_{P_k}[S_k]} < c\sqrt{V_{P_k}^*}$, wherein
$V_{P_k}$ denotes the true variance of the generic k-th Pauli term;
$S_k$ denotes a Pauli-dependent sample budget;
c denotes a tunable scalable factor; and
$V_{P_k}^*$ denotes the measured variance of the k-th Pauli term (from $S_k$ sample budget).

4. The system of claim 1, further comprising:
an approximation component that generates the prescreening variance for the Pauli term using a de minimis sampling budget.

5. The system of claim 1, further comprising:
a calibration component that allocates additional samples to the Pauli-dependent sample budget up to a uniformly distributed sample budget when an evaluation by the feedback component determines that the prescreening variance is incompatible with the production variance generated using the Pauli-dependent sample budget.

6. The system of claim 1, wherein the distribution component sets the Pauli-dependent sample budget to a baseline number of samples when the prescreening variance fails to breach a defined threshold value.

7. The system of claim 1, wherein the distribution component sets the Pauli-dependent sample budget utilizing an intrinsic variance of the Pauli term.

8. The system of claim 1, wherein the distribution component sets the Paul-dependent sample budget for a group of Pauli terms comprising the operator, and wherein the group of Pauli terms comprise a common computational basis.

9. A computer-implemented method, comprising:
setting, by a system operatively coupled to a processor, a Pauli-dependent sample budget for a Pauli term of an operator to unevenly distribute a total sample budget for evaluating an expected value of the operator among a plurality of Pauli terms composing the operator;
executing, by the system, using a quantum computing device, a variational quantum eigensolver on the Pauli term of the operator using the Pauli-dependent sample budget; and
evaluating, by the system, compatibility between a prescreening variance for the Pauli term and a production variance of the Pauli term generated using the Pauli-dependent sample budget.

10. The computer-implemented method of claim 9, wherein the system sets the Pauli-dependent sample budget utilizing the following equation:

$$S_k = \max\left(S_0, \frac{\left(|c_k|\sqrt{V_{P_k}^*}\right)^\alpha}{\sum_{l=1}^{K}\left(|c_l|\sqrt{V_{P_l}^*}\right)^\alpha}\right)$$

wherein:
$S_k$ denotes a Pauli-dependent sample budget;
$S_0$ denotes a baseline number of measurements (or samples);
K denotes the total number of Pauli terms in the Hamiltonian;
$c_k$ and $c_l$ denote the k-th and l-th coefficients of a Hamiltonian expansion, respectively;
$V_{P_k}^*$ and $V_{P_l}^*$ denote the measured variance of the generic k-th and l-th Pauli term, respectively; and
α denotes a real parameter that can be tuned to maximize efficiency.

11. The computer-implemented method of claim 9, wherein the system evaluates the compatibility utilizing the following relationship: $\sqrt{V_{P_k}[S_k]} < c\sqrt{V_{P_k}^*}$, wherein
$V_{P_k}$ denotes the true variance of the generic k-th Pauli term;
$S_k$ denotes a Pauli-dependent sample budget;
c denotes a tunable scalable factor; and
$V_{P_k}^*$ denotes the measured variance of the k-th Pauli term (from $S_k$ sample budget).

12. The computer-implemented method of claim 9, further comprising:
generating, by the system, the prescreening variance for the Pauli term using a de minimis sampling budget.

13. The computer-implemented method of claim 9, further comprising:
allocating, by the system, additional samples to the Pauli-dependent sample budget up to a uniformly distributed sample budget when an evaluation by the feedback component determines that the prescreening variance is incompatible with the production variance generated using the Pauli-dependent sample budget.

14. The computer-implemented method of claim 9, wherein the system sets the Pauli-dependent sample budget to a baseline number of samples when the prescreening variance fails to breach a defined threshold value.

15. The computer-implemented method of claim 9, wherein the system sets the Pauli-dependent sample budget utilizing an intrinsic variance of the Pauli term.

16. A computer program product comprising a computer readable storage medium having program instructions embodied therewith, the program instructions executable by a processor to cause the processor to:
set, by the processor, a Pauli-dependent sample budget for a Pauli term of an operator to unevenly distribute a total sample budget for evaluating an expected value of the operator among a plurality of Pauli terms composing the operator;

executing, by the processor, using a quantum computing device, a variational quantum eigensolver on the Pauli term of the operator using the Pauli-dependent sample budget; and evaluate, by the processor, compatibility between a pre-screening variance for the Pauli term and a production variance of the Pauli term generated using the Pauli-dependent sample budget.

17. The computer program product of claim 16, the program instructions executable by the processor to further cause the processor to:

set, by the processor, the Pauli-dependent sample budget utilizing the following equation:

$$S_k = \max\left(S_0, \frac{\left(|c_k|\sqrt{V_{P_k}^*}\right)^\alpha}{\sum_{l=1}^{K}\left(|c_l|\sqrt{V_{P_l}^*}\right)^\alpha}\right), \text{ wherein:}$$

wherein:

$S_k$ denotes a Pauli-dependent sample budget;

$S_0$ denotes a baseline number of measurements (or samples);

K denotes the total number of Pauli terms in the Hamiltonian;

$c_k$ and $c_l$ denote the k-th and l-th coefficients of a Hamiltonian expansion, respectively;

$V_{P_k}^*$ and $V_{P_l}^*$ denote the measured variance of the generic k-th and l-th Pauli term, respectively; and $\alpha$ denotes a real parameter that can be tuned to maximize efficiency.

18. The computer program product of claim 16, the program instructions executable by the processor to further cause the processor to:

evaluate, by the processor, the compatibility utilizing the following relationship: $\sqrt{V_{P_k}[S_k]} < c\sqrt{V_{P_k}^*}$, wherein $V_{P_k}$ denotes the true variance of the generic k-th Pauli term;

$S_k$ denotes a Pauli-dependent sample budget;

c denotes a tunable scalable factor; and $V_{P_k}^*$ denotes the measured variance of the k-th Pauli term (from $S_k$ sample budget).

19. The computer program product of claim 16, the program instructions executable by the processor to further cause the processor to:

generate, by the processor, the prescreening variance for the Pauli term using a de minimis sampling budget.

20. The computer program product of claim 16, the program instructions executable by the processor to further cause the processor to:

allocate, by the processor, additional samples to the Pauli-dependent sample budget up to a uniformly distributed sample budget when an evaluation by the feedback component determines that the prescreening variance is incompatible with the production variance generated using the Pauli-dependent sample budget.

21. The computer program product of claim 16, the program instructions executable by the processor to further cause the processor to:

set, by the processor, the Pauli-dependent sample budget to a baseline number of samples when the prescreening variance fails to breach a defined threshold value.

* * * * *